United States Patent [19]

Trouiller et al.

[11] 3,900,824

[45] Aug. 19, 1975

[54] METHODS OF PREVENTING CYCLE SKIPPING IN PROCESSING ACOUSTIC WELL-LOGGING SIGNALS

[75] Inventors: Jean Claude Trouiller, Chaville; Guy Lafont, Paris, both of France

[73] Assignee: Schlumberger Technology Corporation, New York, N.Y.

[22] Filed: Feb. 16, 1973

[21] Appl. No.: 332,926

[30] Foreign Application Priority Data
Feb. 17, 1972  France .................. 72.05300

[52] U.S. Cl. ..... 340/15.5 AC; 181/103; 340/15.5 A; 340/15.5 TN
[51] Int. Cl. ............................................. G01v 1/40
[58] Field of Search 340/15.5 TN, 15.5 A, 15.5 GE, 340/18 DC, 15.5 AP, 15.5 BH, 15.5 AC; 181/.5 BI, .5 DS

[56] References Cited
UNITED STATES PATENTS

| | | | |
|---|---|---|---|
| 3,289,157 | 11/1966 | Brokaw | 340/15 TN |
| 3,467,875 | 9/1969 | Engle | 340/15 TN |
| 3,618,001 | 11/1971 | Zill | 340/15 TN |

*Primary Examiner*—Benjamin A. Borchelt
*Assistant Examiner*—H. J. Tudor
*Attorney, Agent, or Firm*—Brumbaugh, Graves, Donohue & Raymond

[57] ABSTRACT

Method and apparatus for correcting measurement errors due to cycle skipping in acoustic-wave transit time measurements.

The measurement made during sequence N-1 is stored in an auxiliary memory and compared with the next measurement (sequence N). If the difference between the two successive measurements is smaller than a given fraction of the average period of the acoustic waves used, the measurement of sequence N is transmitted to a measurement memory and recorded. Otherwise, it is the last measurement considered good which is recorded. Moreover, in case of erroneous measurement, the transfer of the control signal for the gain applied to the reception signal is stopped and the gain remains at its former value.

Significant improvement in the quality of acoustic well-logging recordings is achieved.

5 Claims, 4 Drawing Figures

(SURFACE APPARATUS)

METHODS OF PREVENTING CYCLE SKIPPING IN PROCESSING ACOUSTIC WELL-LOGGING SIGNALS

BACKGROUND OF THE INVENTION

This invention relates to methods and apparatus facilitating the processing of acoustic well-logging signals and, more particularly, to novel and highly-effective methods and apparatus allowing the automatic correction of errors due to cycle skipping in the measurement of the transit time of the acoustic measurement waves used.

Acoustic well-logging methods and apparatus are usually designed to measure the transit time of an acoustic wave between a first and a second point.

French Patent No. 1,349,989 discloses such a method employing two receivers placed a certain distance from each other, between two transmitters. With such apparatus, one measures the transit time between the two receivers for waves transmitted respectively by the first and by the second transmitter. By taking the average (i.e., the half-sum) of the transit time thus obtained, an accurate measurement is obtained independent, in particular, of the errors introduced by the tilting of the probe in the borehole.

There are various methods for measuring the transit time of an acoustic wave between a transmitter and a receiver. The method disclosed in the patent mentioned above involves triggering a timing-pulse counter the instant a given half-wave of a synchronous pulse representative of the operating point of the transmitter is applied to the counter's starting circuit and of stopping the counter when the acoustic measurement waves are received and a corresponding half-wave in the reception signal generated by the receiver is applied to the counter's stopping circuit. The standard shaping of the synchronous transmission pulse is easy, and, consequently, the starting of the counter takes place under favorable conditions. This is not true of the reception signal. Because of the presence of noise superimposed on the reception signal generated by the receiver, a detection threshold is set for the reception signal so that the counter is not likely to be stopped accidentally by the noise signals. Such noise signals are of two kinds: those picked up by the receiver and those picked up in the cable (crosstalk). The noise signals generated by the receiver are intermittent and can reach a very high amplitude. Such is the case when the probe strikes against the wall of the borehole and, to a lesser extent (longer duration and lower amplitude), when the probe rubs against a borehole wall which has an uneven surface or cavities. The crosstalk noise picked up in the cable is constantly present, and its amplitude is relatively low compared with that of the noise produced by probe impact against the wall of the borehole.

In practice, when use is made of a well-logging apparatus without any noise correction device, the operator verifies from time to time, on an oscilloscope, the quality of the reception signal received at the surface, and, when he notices that, within the region being surveyed, the average noise superimposed on the reception signal increases or decreases significantly, he modifies accordingly the threshold at which the useful half-wave of the reception signal is detected. Under these conditions, the instant the reception signal exceeds the threshold thus set, a stopping pulse is applied to the counter. Consequently, it is essential that the operator monitor the conditions under which the measurement is carried out. Such monitoring is tedious, and, in spite of the vigilance of the operator, it often happens that the threshold set for the detection of the measurement signals corresponds only belatedly to the instantaneous noise conditions at probe level. This can result in measurement errors.

Alternatively, the signal can in effect be monitored automatically. In this case, the amplitude of the detection threshold is automatically modified as a function of the instantaneous noise amplitude just before the transmission of the acoustic pulse whose transit time is measured. Such a method is described in a U.S. patent application of Bernard Vivet et al. Ser. No. 325,168 and a U.S. patent application of Jean Hubert Guignard, Ser. No. 325,121, for "Acoustic Well Logging With Threshold Adjustment", both filed Jan. 19, 1973.

These means, particularly the automatic means, for adapting the detection threshold to the amplitude of the noise prevailing at the same moment, produce a substantial improvement in the accuracy of the measurement. However, a further correction is sometimes required. Such is the case when the threshold is too low and leads to the stopping of the transit time counter on a noise signal appearing during the transmission-reception interval. This occurs for example when, with the threshold adjusted rather low, the probe strikes the borehole wall just between the acoustic wave transmission and reception instants. Statistically, such a case is relatively rare. On the other hand, a relatively frequent case is the one in which the signal/noise ratio (for the signal half-wave of interest) at the level of the receiver drops below unity. This may be the case when the formations traversed by the borehole have a high attenuation for acoustic waves and, in addition, a rough wall or more-or-less deep cavities. In this case, the rubbing of the probe or of its holding arms on the borehole wall generates, for several successive measurement signals, noise having an amplitude considerably greater than the amplitude of the half-wave of the reception signal used for measuring the transit time. Since the detection threshold is set as a function of the noise existing at that instant, the detection of the reception signal will then take place on the half-wave of the same polarity which follows— and which has an amplitude 2 to 3 times higher—, so that the measured transit time is increased by the duration of the average period of the transmitted acoustic waves. This well-known phenomenon is called cycle skipping and appears from time to time whatever the speed and the accuracy of the detection threshold adjustment as a function of noise. This cycle skipping error adversely affects the quality of the logging. It is of course possible for a skilled analyst to notice such an error when studying the recording, since it will then exhibit sudden transit-time variations of short duration. In the case where a differential measurement of transit time between two receivers is made, cycle skipping can lead to either an increase or a decrease in the measured transit time, depending on whether the error affects the remote receiver or the receiver near the transmitter.

When automatic regulation of the average amplitude of the useful half-wave is used, by controlling the gain of the downhole amplifier, as disclosed in the patent applications mentioned above, cycle skipping can lead to the locking of the entire measurement system on an incorrect half-wave of the reception signal. In this case, the gain of the downhole amplifier is decreased in accordance with the ratio of the amplitude of the second half-wave of chosen polarity (generally negative) of the reception signal to the amplitude of the first half-wave of the same polarity. The result is then a series of erroneous measurements which are practically impossible to detect.

SUMMARY OF THE INVENTION

An object of the present invention is to remedy the problems outlined above and, in particular, to provide a method and apparatus allowing the automatic correction of random errors in the measurement of acoustic wave transit times in earth formations traversed by a borehole due to the presence of intermittent noises superimposed on the reception signal.

The foregoing and other objects are attained according to the invention in a well-logging method of the kind in which measurement signals representative of the transit time of an acoustic measurement wave between a first and a second point are respectively generated during successive measurement sequences corresponding to transmissions and receptions respectively performed at points which, from one sequence to another, remain close to each other. The method is characterized by the following steps, in which N refers to the Nth measurement sequence, N-1 to the measurement sequence immediately preceding the Nth measurement sequence, and N+1 to the measurement sequence immediately following the Nth measurement sequence:

1. A measurement signal N−1, corresponding to measurement sequence N−1, is generated and introduced into an auxiliary memory.
2. A measurement signal N, corresponding to measurement sequence N, is likewise generated.
3. The two measurement signals N−1 and N are compared to determine whether or not their difference in absolute value is smaller than a given threshold value.
4. If the difference is smaller than the threshold, the measurement signal N is transferred into a measurement memory and recorded as a function of the depth of the formation.
5. If the difference is not smaller than the threshold, the measurement memory is left in its former state, and the information it contains is recorded as a function of depth.
6. Finally, the measurement signal N is substituted for the measurement signal N−1 in the auxiliary memory. The apparatus is then ready for measurement sequence N+1.

By virtue of this method, any variation in the measured transit time from one measurement sequence to another which is greater than a given significant fraction (two-thirds or three-fourths for example) of the average period of the acoustic measurement waves results in the elimination of the measurement of such transit time and in the recording of the last preceding proper measurement. Such a preceding proper measurement is the one which exhibited, in relation to the measurement immediately preceding it, a variation in measured transit time smaller than a given fraction of the average period of the acoustic measurement waves and which, consequently, was considered to be good. Moreover, the use of such a method leads to the immediate recording of any transit time measurement exhibiting, in relation to the preceding measurement, a variation smaller than a given fraction of the average period of the transmitted waves. Such a method is justified whenever two successive measurement sequences are carried out on sections of formations which have common parts over at least 90% of their length. The speed of the probe and the frequency of the measurement sequences are typically chosen as a function of each other to ensure that such will be the case.

Preferably, the amplification coefficient applied to the reception signal, which is variable in order to ensure an at least approximate regulation of the amplitude of the particular half-wave of the reception signal chosen for carrying out the measurement of the transit time, is kept at its former value as long as the transit time variation, measured from one sequence to another, is greater than the value of the threshold set for it.

Thus, the locking of the measurement system on an incorrect half-wave of the reception signal is avoided, while the conditions for a return to normal functioning, allowing a locking of the measurement circuits on the chosen half-wave and a proper regulation of its amplitude, are ensured.

BRIEF DESCRIPTION OF THE DRAWING

A better understanding of the invention may be gained from a consideration of the following detailed description of the preferred embodiments thereof, in conjunction with the appended figures of the drawing, wherein.

DESCRIPTION OF THE PREFERRED EMBODIMENTS

Figure 1:
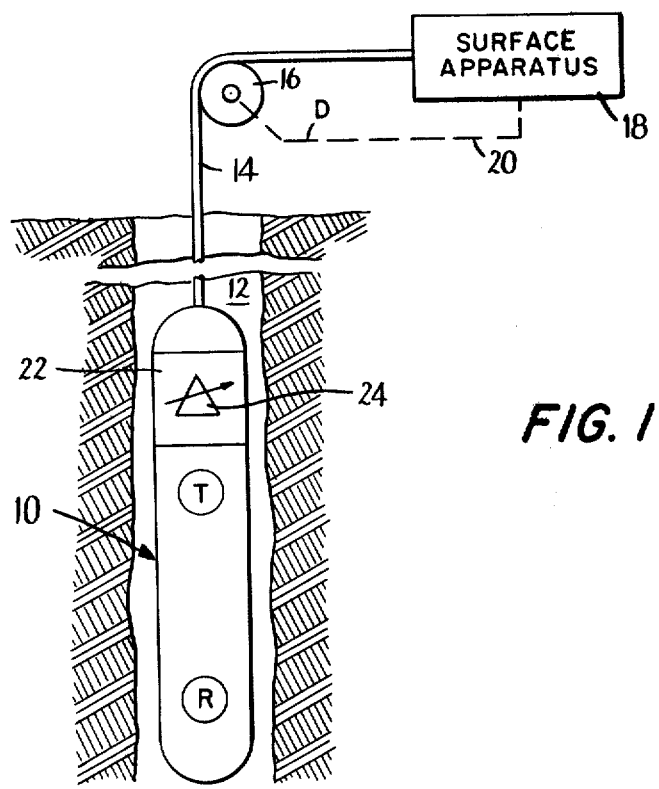
FIG. 1 is a diagrammatic view in elevation of a probe according to the invention lowered into a borehole traversing earth formations.

FIG. 1 shows a probe 10 according to the invention lowered into a borehole 12 by a cable 14 running over a measurement pulley 16 and connected to surface apparatus 18. A mechanical connection 20 between the measurement pulley 16 and the surface apparatus 18 makes it possible to record as a function of depth D the measurements made by the probe 10. The probe 10 includes an acoustic transmission transducer T and an acoustic reception transducer R. In a cartridge 22 are placed all the triggering circuits of the transmission transducer T. In addition, the cartridge 22 includes a variable gain amplifier 24 to which are applied the signals generated by the reception transducer R. The amplifier 24 applies to the cable 14 a composite signal SC shown in FIG. 4 which comprises, on the one hand, a normalized pulse $T_0$ generated by a particular circuit of the cartridge 22, in synchronism with the transmission produced by the transducer T and, on the other, the reception signal SR generated by the transducer R and amplified by the amplifier 24.

Figure 2:
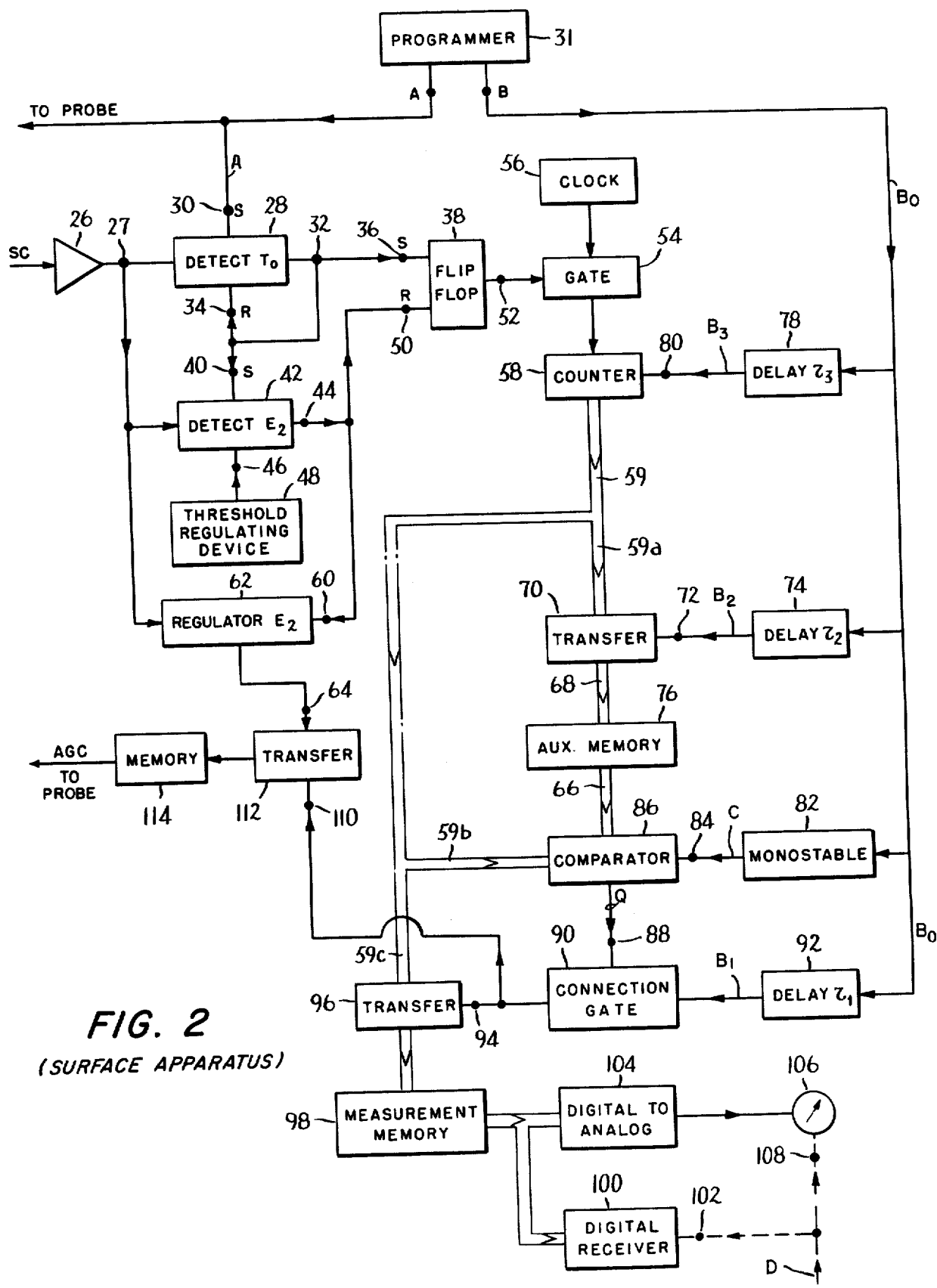
FIG. 2 is a schematic view of electrical circuits according to the invention at the surface for processing the signals transmitted by the probe.

The composite signal SC is applied in the surface apparatus to an amplifier 26 (FIG. 2). The signal appearing at the output 27 of the amplifier 26 is applied to a detection circuit 28 whose purpose is to generate an output pulse at its output 32 when the pulse $T_o$ in synchronism with the transmission crosses a given detection threshold $SD_o$ (see FIG. 4).

Figure 4:
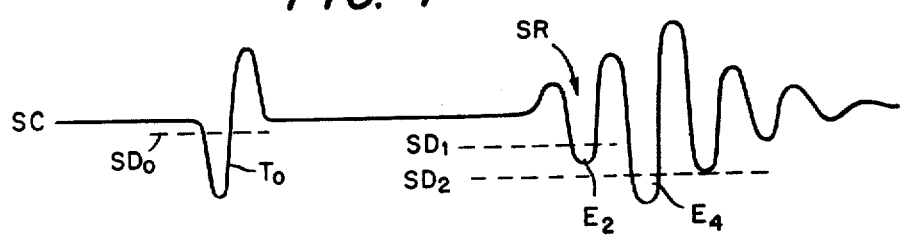
FIG. 4 is a diagram of a reception signal transmitted to the surface and applied to the apparatus of FIG. 2.

The detector 28 has a set terminal 30 to which is applied a triggering pulse A (frequency of about 20 Hz) generated by a programmer 31 to trigger the operation of the transmission transducer T in the probe 10. The detector 28 includes a reset terminal 34 to which is connected its output terminal 32. The output terminal 32 of the detector 28 is connected to the set terminal 36 of a flip-flop 38 and to the set terminal 40 of a reception detector 42. This detector is adapted to generate a pulse at its output terminal 44 when the composite signal SC amplified by the amplifier 26 and applied to it passes a detection threshold SD (two theoretically possible levels of which are shown in FIG. 4). This detection threshold is a DC voltage applied to the threshold establishment terminal 46 of the detector 42 by means of a threshold adjustment device 48. The threshold adjustment device can be manual or automatic as described in the patent applications mentioned above. The output terminal 44 of the detector 42 is connected to the reset terminal 50 of the flip-flop 38. The output terminal 52 of the flip-flop 38 is connected to the control terminal of a gate 54 arranged between a clock 56 generating timing pulses and a pulse counter 58.

The output terminal 44 of the detector 42 is also connected to the triggering terminal 60 of an amplitude regulating circuit 62 receiving the composite signal SC at its input. The amplitude regulating circuit 62 (described in detail in the patent applications mentioned above) is adapted to generate, at its output 64, an error signal representative of the difference between a reference voltage and the average value of the half-wave of the reception signal SR which was detected by the detector 42.

By an assembly of connections 59, the different stages of the counter 58 are connected to transfer circuits 70. These circuits 70 include a common control terminal 72 to which is applied a pulse $B_2$ (duration of 1 to 2 ms) generated with a delay $\tau_2 = 10$ ms approximately, by a delay circuit 74 receiving a pulse $B_o$ (see FIG. 3) generated by the programmer 31. Through an assembly of connections 68, the transfer circuits 70 transmit the states of the different stages of the counter 58 to an auxiliary memory 76. The pulse $B_o$ generated by the programmer 31 is applied also to another delay circuit 78 generating a delay $\tau_3 = 15$ ms approximately. The delay 78 generates a triggering pulse $B_3$ (duration of 1 to 2 ms) applied to the reset terminal 80 of the counter 58.

Figure 3:
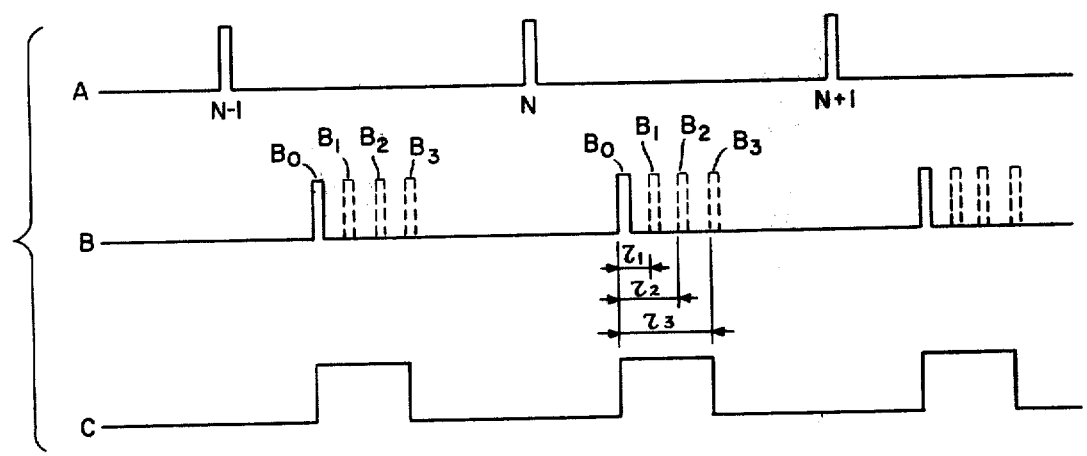
FIG. 3 is a diagram of different signals generated by the apparatus of FIG. 2.

This same pulse $B_o$ is also applied to a monostable circuit 82, which generates a control pulse C having a duration equal to about 15 ms (see FIG. 3). The pulse C is applied to the set terminal 84 of a digital comparator 86. The comparator 86 receives, on its first series of inputs, via an assembly of connections 66, the states of the different stages of the auxiliary memory 76, and on its other series of inputs, via an assembly of connections 59b, the states of the different stages of the counter 58. When no control pulse C is applied to its set terminal 84, the digital comparator 86 is at rest, and a logic signal 0 appears at its output terminal Q. When a pulse C is applied to its set terminal 84, the comparator 86 is adapted to generate, at its output Q, a logic signal 1 when the two counts which are respectively applied to it via the connections 66 and 59b differ from each other by a quantity smaller than a given numerical threshold. In the opposite case, when the difference in absolute value is not smaller than this threshold, a logic signal 0 appears on the terminal Q. The output terminal Q of the comparator 86 is connected to the set terminal 88 of a connection gate 90 which receives, from a delay circuit 92 (delay $\tau_1 = 5$ ms approximately), a pulse $B_1$ (duration of 1 to 2 ms) derived from $B_o$ (see FIG. 3).

The output terminal of the connection gate 90 is connected to the control terminal 94 of a transfer circuit 96 arranged between the counter 58 and a measurement memory 98. The measurement memory 98 is connected to a digital recorder 100 having a mechanical input 102 to which is applied the depth signal D generated by the measurement pulley 16 (FIG. 1). Furthermore, the output of the measurement memory 98 is applied to a digital-to-analog converter 104 followed by an analog recorder 106 receiving, at its mechanical input 108, the same depth signal D.

The output terminal of the connection gate 90 is also connected to the control terminal 110 of a transfer circuit 112 inserted between the output terminal 64 of the regulator 62 and a memory 114 (analog or digital depending on the requirement). The output of the memory 114 furnishes an automatic gain control signal applied, via the cable 14, to the gain-control terminal of the variable-gain amplifier 24 mounted in the electronic cartridge 22 of the probe 10.

The timing pulses A delivered by the timer or programmer 31 cause the emission of acoustic waves by the transmission transducer T arranged in the probe 10. After having propagated into the formations traversed by the borehole 12, these waves generate, in the reception transducer R, a reception signal SR which is applied to the variable-gain amplifier 24. The pulse $T_o$ in synchronism with the acoustic transmission of the transducer T and the output signal of the amplifier 24 are applied to the cable 14 and appear at the surface in the form of a composite signal SC represented in FIG. 4. With the detector 28 set by the pulse A, at the moment when the negative half-wave of the pulse $T_o$ crosses the detection threshold $SD_o$, a pulse appears on the output terminal 32 of the detector 28 which sets the flip-flop 38. This output pulse is also applied to the reset or clearing terminal 34 of the detector 28. This immediately blocks the detector thereby making it insensitive to any subsequent signal.

Upon the appearance of the output pulse of the detector 28, the detector 42 is set. The detection threshold of the detector 42 is set by the threshold voltage applied to the terminal 46 through the threshold-adjustment device 48. Such a threshold is, for example, $SD_1$ (see FIG. 4). In such a case, as soon as the half-wave $E_2$ of the reception signal SR crosses the threshold $SD_1$, an output pulse appears on the terminal 44 which is applied to the reset terminal 50 of the flip-flop 38. The gate 54 inserted between the clock 56 and the counter 58 is thus in the conducting state during the time interval between the instant the acoustic measurement waves are transmitted by the transducer T and the instant they are received by the transducer R. The number of timing pulses counted by the counter 58 during this time interval is therefore representative of the transit time of the acoustic waves in the section of formation between the transducers T and R.

The operation of the acoustic well-logging apparatus described above is as follows:

It will be assumed that, during the preceding measurement sequences, at least one measurement considered to be good has been transferred to the measurement memory 98. Since the quality of the measurement conducted during the measurement sequence N−2 is not known, we shall consider what takes place as of the instant of appearance of the transfer control pulse $B_2$ of the measurement sequence N−1. When the pulse $B_o$ of the measurement sequence N−1 is generated by the programmer 31, it is applied to the delay circuit 74 which, after a delay $\tau_2 = 10$ ms approximately, delivers to the control terminal 72 of the transfer circuit 70 a pulse $B_2$ whose duration is from 1 to 2 milliseconds. Under these conditions, the count made by the counter 58 during measurement sequence N−1 is transferred to the auxiliary memory 76. Then, the delay circuit 78, which also receives the pulse $B_o$, generates, after a delay $\tau_3 = 15$ ms approximately, a pulse $B_3$ (duration of 1 to 2 ms) applied to the reset terminal 80 of the counter 58. At this instant, measurement sequence N can begin, the measurement signal of the transit time obtained during the measurement sequence N−1 being safely stored in the auxiliary memory 76.

During measurement sequence N, under the action of the pulse $B_o$, the monostable circuit 82 generates a pulse C applied to the set terminal 84 of the comparator 86. Under these conditions, the output Q of the comparator 86 takes on, throughout the duration of the pulse C, a state 1 or 0 depending on whether or not the count made by the counter 58 during measurement sequence N differs by a predetermined number from the count stored in the auxiliary memory 76 during measurement sequence N−1. This predetermined number is safely less than a number representative of the average period of the acoustic waves transmitted by the transmission transducer T. For example, for an average transmission frequency of 25 kHz and a clock frequency of 10 MHz, the count or number representative of the average period of the acoustic waves is $10,000,000/25,000 = 400$. Under these conditions, a threshold number of, say, 300 might be chosen. If the detection threshold set at the reception detector 42 by the threshold-adjustment device 48 has, during two successive sequences, a value $SD_1$ then a value $SD_2$ (FIG. 4), or if for any reason whatever the amplitude of the half-wave $E_2$ drops below the set detection threshold, the halfwave $E_4$ will be detected, so that the difference between the two counts applied to the comparator 86 will thus be at least equal to the number representative of the duration of the period (or 400 in the example of 10 MHz divided by 25 kHz), which is characteristic of cycle skipping. Since the period in question is in fact, in the reception signal SR, a pseudo-period which varies slightly as a function of the acoustic impedance of the traversed formations, the offset threshold set at the comparator 86 is taken slightly lower than (about 70% of) the average transmission period so as to be suitable for all types of formations that may be encountered.

We shall now assume that, during measurement sequence N, the difference between the two counts applied to the comparator 86 is less than the threshold number thus set. Under these conditions, the connection gate 90 receives, at its set terminal 88, a logic signal 1 so that the pulse $B_1$ delivered by the delay circuit 92 (with a delay $\tau_1 = 5$ ms approximately in relation to $B_o$) is applied, via the gate 90, to the control terminal 94 of the transfer circuit 96. Under the effect of this control pulse, the transfer circuit 96 applies the states of the different stages of the counter 58 to the measurement memory 98. The result is that the recorders 100 and 106, which have received on their respective mechanical control terminals 102 and 108 a control for advancement in depth D, record the new value of the transit time measured during sequence N.

If, on the other hand, the threshold $SD_1$ and the half-wave $E_2$ had triggered the operation of the detector 42 during measurement sequence N−1, then the threshold $SD_2$ and the half-wave $E_4$ triggered the operation of the detector 42 during measurement sequence N, the comparator 86 would have supplied at its output Q a logic signal 0. Under these conditions, the connection gate 90 is closed at the moment the pulse $B_1$ appears, and the count stored in the measurement memory 98 is not modified. In this case, the recorders 100 and 106 continue to record as a function of the new value of depth D a measurement identical to the last good measurement transferred to the memory 98.

An error correction similar to that which follows cycle skipping in the reception detector circuit 42 is also obtained in the case where a noise signal (due, for example, to probe impact) having an amplitude exceeding the detection threshold $SD_1$ appears at an instant that precedes the useful half-wave of SR by a time interval corresponding to a value greater than the threshold established in the comparator 86.

Shortly after the appearance of the pulse $B_1$ of measurement sequence N, a pulse $B_2$ appears which produces the transfer to the auxiliary memory 76 of the count made by the counter 58 during measurement sequence N. Then, a pulse $B_3$ appears which resets the counter 58. Then, for measurement sequence N+1, conditions similar to those which prevailed at the beginning of measurement sequence N are restored: i.e., there is a zero count in the counter 58 and, in the auxiliary memory, there is the count made by the counter 58 during the preceding measurement sequence.

We saw earlier that, in the case where the comparator 86 detects that the two counts which are respectively applied to its two inputs show a difference higher than a given threshold number, a logic signal 0 appears at its output Q, the connection gate 90 is closed, and the transfer control pulse $B_1$ which is applied to it is not transmitted to the transfer circuit 96. Since the output terminal of the connection gate 90 is, in addition, connected to the control terminal of the transfer circuit 112, in this case the new gain-control value generated by the regulation circuit 62 is not transmitted to the memory 114, which consequently retains the value transmitted to it during the preceding measurement considered to be good. FIG. 4 shows that, in this case, the half-wave $E_4$ which was used for determining the gain which should be exhibited by the amplifier 24 during the following measurement sequence. The result is that, since the amplitude of the half-wave $E_4$ is substantially higher than that of the half-wave $E_2$ normally detected by the detector 42, the decrease in gain which would otherwise result from the detection of $E_4$ is not produced. During the following sequence, the half-wave $E_2$ is thus sufficiently amplified to provide proper conditions for its detection at the surface by the detector 42. With such an arrangement, the likelihood that the entire measurement system might lock on the half-wave $E_4$ is negligible. Quite the contrary, as soon as an erroneous measurement is detected by the comparator 86, the gain conditions ensuring the return to a correct measurement are automatically established.

In the embodiment described above, a single transmitter and a single receiver are used. The extension of a random-error-correction device according to the invention to an acoustic well-logging apparatus comprising several transmitters and several receivers is easy for those skilled in the art, the differential transit time between two receivers associated during a given cycle with a given transmitter then being taken into account instead of the transit time between a single transmitter and a single receiver.

Furthermore, the method according to the invention can be implemented using measurement signals of the transit times of an acoustic wave furnished by the tape reader of the magnetic recorder 100 on which are recorded the measurement signals generated by an acoustic well-logging apparatus not comprising the random-error-correction device according to the invention. In this case, the reading heads of the recorder replace the different stages of the counter 58. However, in this case, the errors, if any introduced through the locking of the measurement system on the half-wave $E_4$ of the reception signal SR cannot be corrected.

Instead of the digital measurement signal generated by the counter 58, an analog signal representative of transit time can be generated. In this case, the auxiliary memory 76, the measurement memory 98, the transfer circuits 70 and 96 and the comparator 86, forming part of the correction device according to the invention, will be of the analog type, the digital recorder 100 and the digital-to-analog converter 104 being eliminated.

It will also be noted that, instead of having a variable-gain amplifier in the probe, it would be possible, as was done in many acoustic welllogging apparatus and in spite of the disadvantages which this approach entails with regard to cable crosstalk, to have a constant-gain amplifier in the probe and a variable-gain amplifier in the surface apparatus. In this case, the output of the memory 114 would be directly connected to the gain-control terminal of such an amplifier.

The embodiments described above are merely exemplary, and those skilled in the art may make many variations and modifications therein without departing from the spirit and scope of the invention. All such modifications and variations are intended to be within the scope of the invention as defined in the appended claims.

We claim:

1. A method of correcting random errors in the measurement of the transit time between two points of an acoustic wave in earth formations traversed by a borehole, comprising the steps of lowering an acoustic well-logging probe into a borehole, generating successive acoustic waves by means of said probe, generating a composite electric signal corresponding thereto, generating measurement signals responsive to said composite electric signal and representative of the transit time of said acoustic waves between first and second points during successive measurement sequences, said first and second points in successive measurement sequences being respectively relatively close to each other, comparing the measurement signals representative of successive measurements, whether or not valid, to determine whether their difference in absolute value exceeds a threshold value, and making a record as a function of depth of valid measurements, said valid measurements corresponding, in cases where said difference is smaller than said threshold, to the later of said measurement signals and, in other cases, to the measurement signal representative of the latest previous valid measurement.

2. A method according to claim 1 comprising the steps of amplifying said composite signal variably in order to ensure an at least approximate regulation of the average value of the particular half-wave of the composite signal chosen for carrying out the measurement of transit time, and maintaining the amplification coefficient unchanged as long as the difference in said measurement signal exceeds said threshold.

3. A method according to claim 2 wherein the amplification coefficient is applied in the probe to the composite signal and has a value that is normally determined for a given measurement sequence as a function of the amplitude of the same half-wave during the immediately-preceding measurement sequence.

4. A method according to claim 1 wherein the acoustic measurement waves used have an average period and wherein the threshold value is a significant fraction of said average period.

5. A method of correcting random measurement errors due to occasional reduction of the signal-to-noise ratio of reception signals corresponding to acoustic measurement waves which are sequentially generated in a borehole traversing earth formations and of which the transit time between two points in the borehole is measured in successive measuremtn sequences to produce an acoustic log, comprising the steps of comparing two signals respectively representative of the measurements, whether or not valid, of the transit times of said acoustic waves between two points in the borehole during a given measurement sequence and the measurement sequence immediately preceding said given measurement sequence, producing an enabling signal to permit recording of said signal representative of said transit time during said given measurement sequence only in the case where the difference in absolute value between said two signals is smaller than a given threshold, and recording said signal representative of said transit time during said given measurement sequence only if said enabling signal is produced.

* * * * *

UNITED STATES PATENT AND TRADEMARK OFFICE
CERTIFICATE OF CORRECTION

PATENT NO. : 3,900,824
DATED : August 19, 1975
INVENTOR(S) : Jean Claude Trouiller and Guy Lafont It is certified that error appears in the above-identified patent and that said Letters Patent are hereby corrected as shown below:

Column 7, line 57, "f$_o$rmations" should read --formations--; Column 8, line 57, after "was" insert --detected by error by the reception detector 42 is not--; and Column 9, line 25, after "any" insert a comma --,--.

Signed and Sealed this sixteenth Day of December 1975

[SEAL]

Attest:

RUTH C. MASON
*Attesting Officer*

C. MARSHALL DANN
*Commissioner of Patents and Trademarks*